United States Patent [19]

Griffiths

[11] Patent Number: 4,854,188
[45] Date of Patent: Aug. 8, 1989

[54] REMOTELY ENGAGABLE POWER ACTUATOR

[76] Inventor: Edward E. Griffiths, 3446 W. Hacienda, Las Vegas, Nev. 89118

[21] Appl. No.: 189,347

[22] Filed: May 2, 1988

[51] Int. Cl.$^4$ .................... G05G 11/00; F16D 11/00; F16D 27/00
[52] U.S. Cl. ...................... 74/625; 74/479; 192/67 P
[58] Field of Search ............... 74/625, 479; 192/67 P

[56] References Cited

U.S. PATENT DOCUMENTS

| 3,963,051 | 6/1976 | Kuhlmann | 74/625 X |
| 4,240,304 | 12/1980 | Griffiths | 74/625 X |
| 4,574,654 | 3/1986 | Griffiths | 74/625 |

Primary Examiner—Allan D. Herrmann
Attorney, Agent, or Firm—Linval B. Castle

[57] ABSTRACT

A relatively thin but powerful linear power actuator particular adapted for the individual control of a plurality of closely stacked adjacent hydraulic valves. Each of the two disclosed embodiments include a reversible DC motor coupled to reduction gearing which drives a pivotable drive plate. Pivotally coupled to the drive plate is a driven plate from which a linear output shaft extends. The two plates may be connected together by a remotely operable solenoid coupler for motor control of the linear output shaft, or decoupled for manual control of the output shaft independently of the motor control.

5 Claims, 2 Drawing Sheets 4,854,188

REMOTELY ENGAGABLE POWER ACTUATOR

BRIEF SUMMARY OF THE INVENTION

This invention relates generally to linear actuators and in particular to a bi-directional actuator having a remote controlled solenoid operated connector that permits either power or manual operation of the actuator output shaft.

The invention is an improvement over the actuator described and claimed in my U.S. Pat. No. 4,574,654, issued on Mar. 11, 1986.

Powered linear actuators are well known are extensively used for the accurate and reliable remote control of equipment brake controls, throttle levers and similer mechanical devices and are particularly valuable for use in the control of hydraulic valves such as used on heavy equipment. In many instances, several closely adjacent hydraulic valves that may be only approximately two inches in thickness must be controlled by such linear actuators and it is therefore important that such actuators be very narrow while remaining reliable.

In addition to being very narrow to control closely adjacent valve stacks, it is very important that the linear actuators be provided with a remotely operable release which may be manually operated or may be automatically controlled by computer or some pressure or mechanical overload sensor. Furthermore, in addition to size and remote control requirements, an actuator must include a position follow-up system to assure high accuracy in both small and large linear displacements.

Briefly described, the actuator disclosed herein comprises a reversible electrical motor driving a geared speed reducer. In one embodiment the speed reducer is coupled to a slip clutch attached to a pivotable drive plate, and in a second embodiment the speed reducer is attached to a linear screw drive mechanism which is coupled to the pivotable drive plate. The drive plates are thus pivoted and are accurately position regulated by a servo. Pivotably attached to the drive plates are parallel driven plates to which are coupled output shafts which may be connected to operate external devices such as hydraulic valve spools. The drive plates and driven plates are coupled together by a remotely operable solenoid which, when released, permits the driven plates and the output shafts to remain stationary or to be manually moved.

DESCRIPTION OF THE DRAWINGS

In the drawings which illustrate preferred embodiments of the invention.

DETAILED DESCRIPTION

Figure 1:
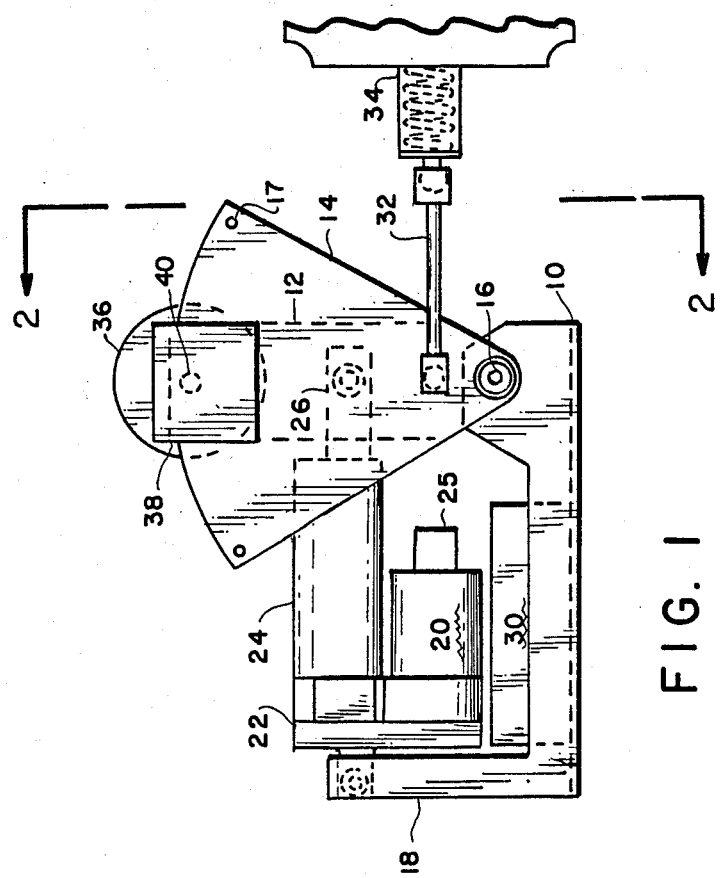
FIG. 1 is a side elevational view of a linear power actuator employing a screw drive mechanism for pivoting a drive plate.

FIG. 1 is an elevational view illustrating one embodiment of my linear actuator mounted on a base 10. A raised edge of the base pivotally supports both a rectangular drive plate 12, shown in dashed lines in FIG. 1, and a pie sector shaped driven plate 14. Both plates 12 and 14 are independently pivoted at the same pivot point 16 so that either may be separately rotated about that point. Excess relative movement between the plates is prevented by pins 17 which extend through the rear surface of the plate 14 to function as stops that limit the pivotal movement of the plate 12.

Spaced along the base 10 approximately ten to twelve inches from the pivot point 16 is a vertical leg 18 that pivotally supports a drive assembly for the drive plate 12. The drive unit includes a reversible DC motor 20 which drives an attached reduction gear 22 that, in turn, controls the length of a screw drive contained within the tubular housing 24 that is pivotally coupled to a point at the approximate center of the rectangular drive plate 12. The motor 20, reduction gear 22, and screw drive with housing 24 may be a single assembly such as marketed by Warner Electric Brake and Clutch Company of Beloit, Wis. Mounted to one end of the drive assembly motor 20 is a positioning potentiometer 25 for counting motor rotation to thus determine the position of the extension arm 26 of the screw drive. The resulting measured position of the drive plate 12 is then compared with an externally generated input signal applied to a servo circuit 30 mounted to the base 10 to derive an error signal which, when equal to zero, indicates that the drive plate 12 is positioned as instructed by the input signal.

A linear output shaft 32 for operating an external device such as a hydraulic valve 34 is pivotally coupled to a point on the centerline of the pie shaped driven plate 14 which is pivoted with the plate 12 at the point 16. The point along the centerline will, of course, depend upon the amount of linear displacement and output force required. The driven plate will independently rotate about its pivot point 16 unless both the plates 12 and 14 are intercoupled. Such intercoupling is done by the remotely operable solenoid 36.

The drive plate 12 is a relatively heavy rectangular plate, pivoted to the base 10 at one end and supporting the solenoid at its opposite end. A hole 40 through the drive plate 12 is coaxial with the solenoid armature pin which, in operation, forces a small steel ball into a hemispherical indentation in the driven plate 14 to interlock the plates 12 and 14.

The solenoid end of the drive plate 12 includes an anvil 38 shaped like an inverted "U" so that as the moving pin of an energized solenoid forces its steel ball through the hole 40 and into the indentation in the surface of the driven plate, the driven plate will not deflect and will be backed up against the inner flat surface of the anvil portion of the "U".

When rotating about its pivot 16, the approximately 60° arcuate portion of the driven plate 14 may pass freely through the opening in the inverted "U" of the anvil 38. The hemispherical indentation, coaxial with the solenoid pin and hole 40 in the drive plate 12 is located on the centerline of the pie shaped driven plate 14 so that, when the solenoid is activated by a remotely applied signal, its pin engages the indentation in the driven plate 14 so that the driven plate and drive plate 12 operate in unison in response to the input positioning signal. The purpose of the anvil 38 is thus to provide a "back-up" that will prevent the thinner driven plate 14 from springing away from the drive plate 12 when the solenoid 36 is activated. The anvil thus holds the driven plate against the drive plate.

If a serious mechanical stall occurs in a mechanism driven by the output shaft while the driven plate 14 is coupled to the drive plate 12, the driven plate 14 will not spring away from the drive plate, but the spherical steel ball and pin in the solenoid 36 will be forced back into the solenoid to release the driven plate from the drive plate. Thus, manual control can override the motor driven control even during excitation of the solenoid.

Figure 3:
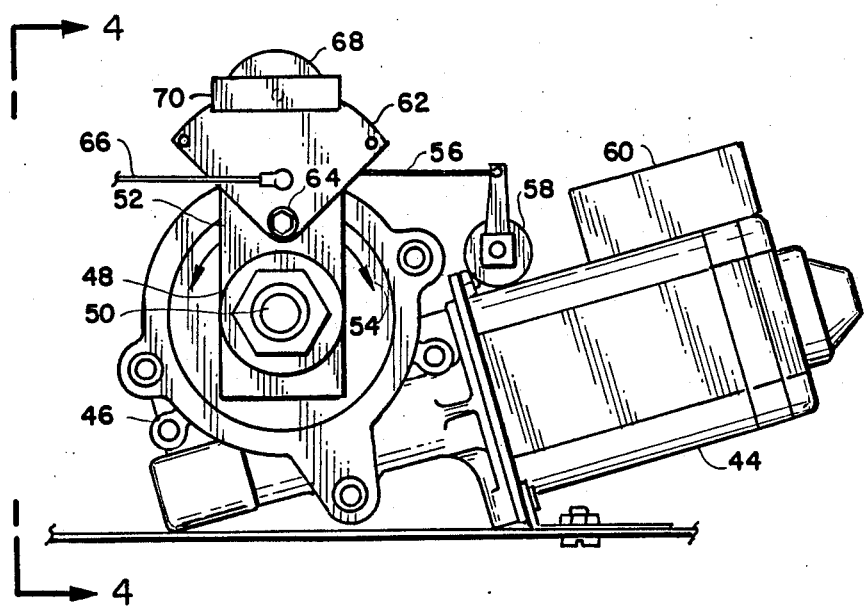
FIG. 3 is a side elevational view of another embodiment of a linear actuator employing a motor driven slip clutch drive for pivoting a drive plate.
Figure 4:
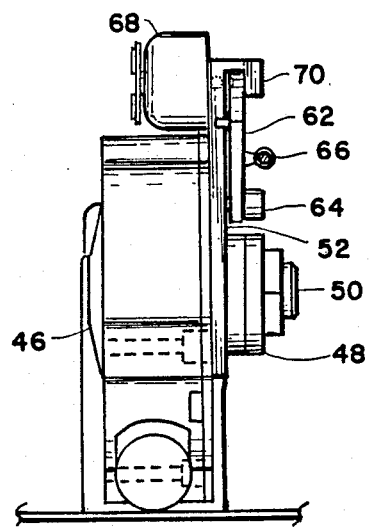
FIG. 4 is an end elevational view of the actuator of FIG. 3 taken along the lines 4—4 thereof.

FIG. 3 is an elevational view of another embodiment of the linear actuator employing a modified motor drive assembly available from United Technologies Electro Systems of Columbus, Miss. The motor drive assembly includes a bidirectional DC motor 44 driving a conventional worm and worm wheel gear contained within a housing 46. An adjustable slip clutch 48, having a diameter of approximately 1½ inches and a thickness of ⅜ inches, is connected to the rotatable output shaft 50 of the worm wheel, resulting in a powerful drive mechanism having a thickness of less than two inches as shown in the end view of FIG. 4.

Frictionally coupled to the slip clutch 48 is one end of a rectangular drive plate 52 which is pivoted around the shaft 50 by operation of the motor 44 as indicated by the arrows 54. Pivotally coupled to the drive plate near its center is a shaft 56 which coupled the plate to an arm controlling the rotation of a position potentiometer 58. As previously described, the potentiometer 58 measures the instantaneous position of the drive plate 52 and a signal representing its resistance is balanced against an externally generated input control signal applied to the servo circuitry 60 to produce an error voltage that controls the rotation of the motor 44.

Figure 2:
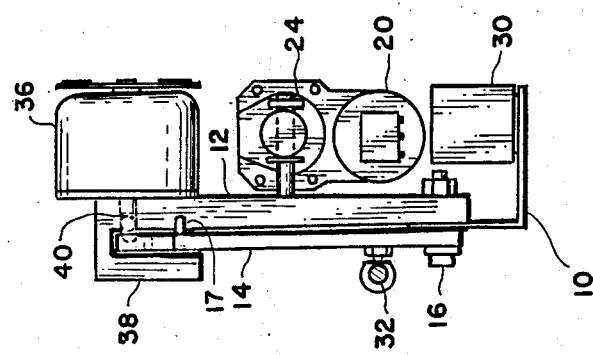
FIG. 2 is an end elevational view thereof taken along the lines 2—2 of FIG. 1.

The rectangular drive plate 52 supports a driven plate 62 which is formed as a sector of a circle centered at a pivot point 64 on the centerline of the plate 52 as closely as possible to the clutch 48. Pivotally coupled to a point on the surface of the driven plate 62 is an output drive shaft 66 which is coupled to some external device such as a hydraulic valve spool. As explained in connection with FIGS. 1 and 2, the driven plate may rotate freely around its pivot point 64 unless coupled to the drive plate 52. Again, this is done with a solenoid 68 which is connected to the end of the drive plate 52 having thereon an inverted "U" shaped anvil 70 within which the drive plate 62 may slip. A steel ball driven by the actuating pin of the solenoid may thus engage a hemispherical indentation near the arcuate edge of the driven plate 62 to lock together the plates 52 and 62. In this embodiment, the two plates may be rigidly locked together by the solenoid driven ball and any malfunction causing a stall in the shaft output of the actuator will merely cause the clutch 48 to slip without damage to the actuator. As with the embodiment described in connection with FIG. 1, the driven plate 62 and output shaft 66 may be released and moved manually, without damage, by force when the solenoid is energized or readily moved manually whenever the solenoid actuating ball and pin is retracted to decouple the plates 52 and 62.

As previously mentioned, one advantage in the designs is that both embodiments of the invention are relatively thin and thus capable of being stacked side by side to operate closely stacked hydraulic valves. This narrow design is obtained by aligning the relatively long thin motors in each unit so that their output shafts are in a plane parallel with a plane containing the output drive shafts of their respective power actuators and therefore in planes parallel with the drive and driven plates.

I claim:

1. A remotely controlled linear power actuator with remotely controllable power disengagement means for permitting free manual movement of said actuator, said linear actuator comprising:
   a drive plate rotatable around a pivot at a first end thereof;
   motor means for rotating said drive plate around said pivot in accordance with an applied remote signal;
   a remotely controlled solenoid mounted at the second end of said plate and on a first surface, said solenoid having an actuating pin movable through said drive plate in a hole normal to the first surface thereof;
   a spherical ball within said actuating pin hole and movable by said actuating pin;
   an inverted U-shaped anvil on the first surface of said drive plate at the position of the actuating pin hole through said drive plate;
   a driven plate pivotally coupled for free rotation parallel to said drive plate, said driven plate having an arcuate portion centered at the pivot point on said drive plate and having an arcuate periphery movable within the opening in said U-shaped anvil, said driven plate having a surface indentation adjacent its arcuate periphery and coaxial with said actuating pin hole for receiving a portion of said spherical ball for interlocking said driven plate with said drive plate; and
   a linearly movable output shaft pivotally coupled to said driven plate at a point on a line between its pivot point and actuating pin indentation, said shaft being substantially perpendicular to said line and the axis of said pivot.

2. The linear power actuator claimed in claim 1 wherein said motor means is coupled through gear reduction means to said drive plate.

3. The linear power actuator claimed in claim 2 wherein said motor means includes an electric motor having a rotatable output shaft in a plane parallel with the plane of said drive plate and said driven plate.

4. The linear power actuator claimed in claim 3 further including servo circuitry responsive to an externally applied control signal and a signal from a position sensor responsive to a position of said drive plate for controlling the excitation of said electric motor.

5. The linear power actuator claimed in claim 1 wherein said driven plate is formed as a substantial sector of a circle centered at a pivot point of rotation of said driven plate.

* * * * *